Nov. 8, 1932.  A. ROSENTHAL  1,886,906
STACKER ATTACHMENT FOR CORN HUSKERS
Filed Dec. 5, 1930
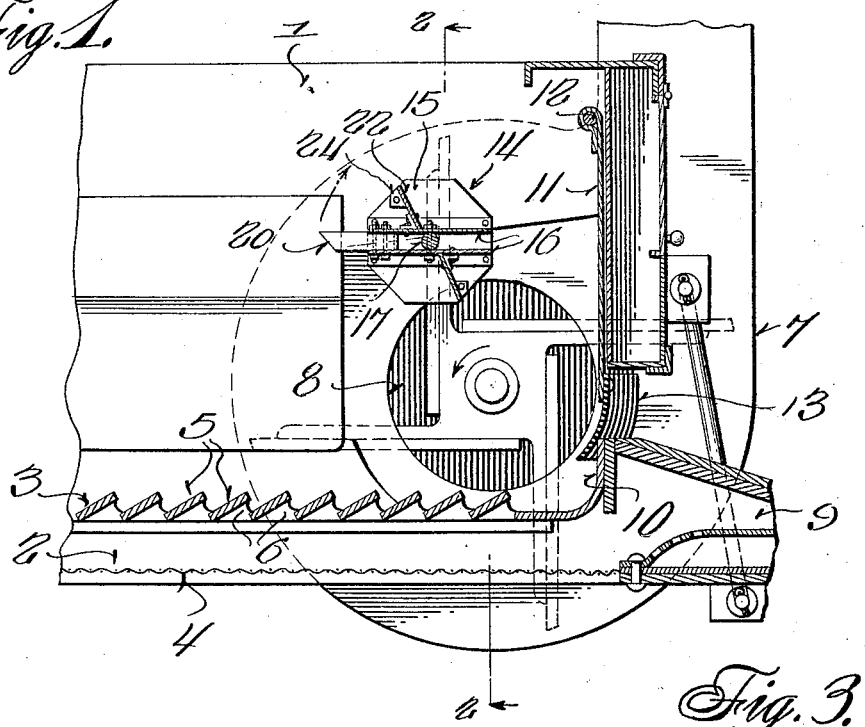
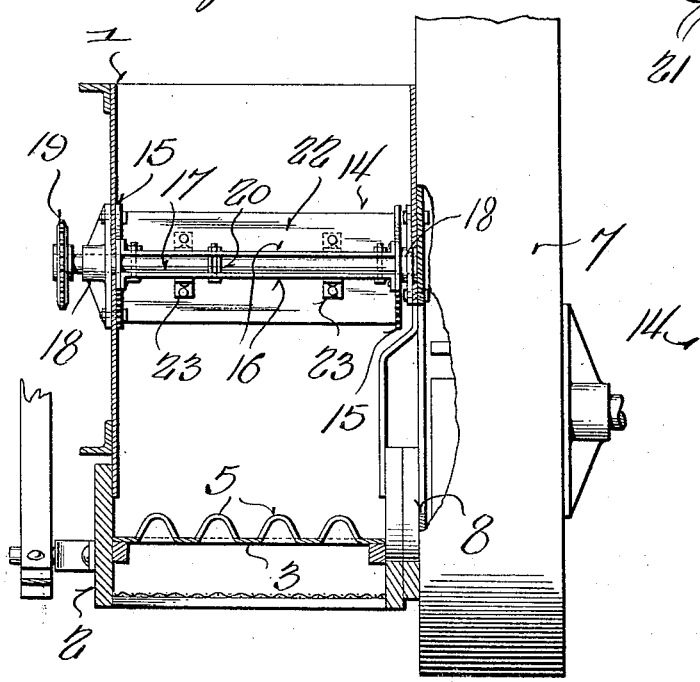
Inventor
August Rosenthal
By Young & Young
Attorneys Patented Nov. 8, 1932

1,886,906

UNITED STATES PATENT OFFICE

AUGUST ROSENTHAL, OF WAUWATOSA, WISCONSIN, ASSIGNOR TO ROSENTHAL MANUFACTURING COMPANY, OF WEST ALLIS, WISCONSIN

STACKER ATTACHMENT FOR CORN HUSKERS

Application filed December 5, 1930. Serial No. 500,257.

This invention relates to corn huskers of the well-known "Rosenthal" type, utilizing a conveyor for feeding the material to a blower.

In machines of the foregoing type, one of the difficulties encountered resides in the prevention of excessive accumulation of material at the blower opening, with resulting clogging of the same.

It is, therefore, the primary object of the present invention to provide means above the conveyor to prevent excessive accumulation of material at the blower opening, thus insuring uniform gradual feeding of the material to the blower, which not only prevents clogging of the blower opening, but also overloading of the blower.

Incidental to the foregoing, a more specific object of the invention resides in the provision of means for retarding and/or distributing any excessive accumulation of material adjacent the blower opening.

A more specific object of the invention is to provide a beater positioned adjacent the top of the blower opening and rotatable in a direction opposite to the feed of the material, whereby excessive feed of the material is retarded and any undue accumulation is distributed.

A still further object resides in the provision of a beater of the foregoing type comprising longitudinal blades in combination with transverse fingers, certain of said blades being arranged angularly with relation to the longitudinal axis of the beater to shift the material engaged thereby away from the blower opening, but towards the blower side of the conveyor and also retard the feed of the same.

With the above and other objects in view, which will appear as the description proceeds, the invention resides in the novel construction, combination, and arrangement of parts substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing, Figure 1 is a longitudinal sectional view through that portion of a corn husker in which the present invention is incorporated;

Figure 2 is a transverse section taken on the line 2—2 of Figure 1; and

Figure 3 is a detail plan view of the beater.

Referring now more particularly to the accompanying drawing, the numeral 1 designates generally the discharge end of a conventional type of corn husker provided with a reciprocative shaker trough 2, which trough comprises a main feeding screen 3 and an auxiliary separating screen 4 adapted to collect separated kernels of corn and sift out particles of dirt and foreign material. The feeding screen 3 is preferably formed of sheet metal and provided with struck-up lips 5 adjacent the apertures 6, whereby upon movement of the screen in one direction the material is fed forwardly while dirt and loose kernels of corn are delivered to the collecting screen 4. Obviously, when the shaker is shifted rapidly in the opposite direction, the struck-up tongues 5 will slide under the material, thus causing the same to be intermittently fed forwardly upon the shaker.

At its discharge end, the frame 1 carries a conventional blower conveyor 7 provided with an axial intake opening 8 located at one side of the shaker adjacent its discharge end and just above the feeding screen 3. One end of the shaker 2 carries a discharge head 9 against which the feeding screen 3 terminates in an upturned flange 10, which serves to retain the cut material on the feeding screen until such time as the same is drawn into the blower opening 8.

Positioned above the shaker trough adjacent the outer end thereof is a swinging plate 11, which extends across the trough toward the intake opening 8 of the blower conveyor. The upper end of the swinging plate 11 is suitably supported upon a pivot rod 12 carried by the husker frame 1, while the lower edge of the plate has secured thereto in any suitable manner a depending flexible flap or apron 13. The flap or apron 13 is preferably made of rubber or similar flexible material, and is arranged in the path of the vertical flange 10, whereby upon reciprocation of the trough 2, the apron 3 is intermittently engaged to effect limited oscillation of the plate 11.

By this construction it will be seen that as the material is fed forwardly upon the screen 3, and engages the oscillating plate 11, the same will be intermittently shifted toward the blower opening 8, it being understood that the plate 11 is angularly arranged with relation to the axis of the blower opening, as shown in my pending application filed September 17, 1930, Serial No. 489,381. Naturally, as the material is fed along upon the shaker screen 3 in the blower opening 8, the same will be drawn into the blower and delivered to any suitable point desired.

While the foregoing structure has been illustrated and described in some detail, it will be understood that the same forms no part of the present invention other than in the general combination as hereinafter claimed.

While the foregoing structure has to a certain extent overcome excessive accumulation of material and clogging of the blower opening, still under certain conditions of material and excessive heavy feed of the same, this objection is still occasionally encountered, and therefore the present invention is designed to eliminate any possibility of clogging under all conditions. This is accomplished in the present instance by means of a beater 14 designed to be rotated in a direction opposite to the feed of the material, as indicated by the arrow in Figure 1.

While the beater may be constructed in various ways, for the purpose of durability and cheapness of construction it is proposed to fabricate the same from sheet material. Therefore, a pair of end heads 15 are provided which are connected by a pair of parallel spaced plates 16 secured to the heads in any suitable manner and fastened upon a shaft 17 positioned between the plates 16. The shaft 17 is journalled in suitable bearings 18 carried by the husker frame, and is provided at one end with a sprocket 19 through which the shaft is rotated by means of a chain connection with any suitable power source present in the husker.

As will be best noted in Figures 1 and 2, at suitable spaced intervals, transverse fingers 20 are positioned between the parallel plates 16 and project therefrom to engage any excessive accumulation of material and thus break up or distribute the same.

As best shown in Figure 3, the transverse fingers are adjustably attached in order that the same may be projected, retracted or removed to best accommodate the particular character of material being fed through the husker. This is accomplished by bending the inner ends of the fingers back upon themselves to straddle the attaching bolts 21. Thus, by loosening the bolts 21, the fingers may be slid inwardly or outwardly with relation to the beater.

Cooperating with the plates 16 are auxiliary plates 22 attached to the plates 16 by suitable brackets 23 and to the end plates 15 by the ears 24. As will be noted in Figure 3, the plates 22 are angularly inclined with relation to the axis of the beater and therefore as they engage the material they tend to wipe or throw the same toward that side of the shaker adjacent the blower opening, although at the same time the material is thrown rearwardly away from the opening.

From the foregoing explanation taken in connection with the drawing, it is believed that the operation of the present invention will be quite apparent, in that normal feeding of the material by the shaker to the blower opening is in no way affected. However, should an excessive amount of material accumulate adjacent the blower opening and tend to obstruct the same, such material will be engaged by the blades and fingers of the beater, which being rotated in a direction opposite to the feed of the material will cause the same to be distributed away from the blower opening until such time as a gradual normal feed is again obtained In connection with the foregoing, an essential feature of the present invention resides in the position of the beater with relation to the blower opening. As will be readily seen from the showing in Figure 1, the beater is mounted closely adjacent and above the blower opening 8, the axis of the beater being positioned just forwardly of the axis of the blower. Thus, should an excessive amount of material tend to accumulate, the same is distributed by the beater before it has an opportunity to completely obstruct or clog the blower opening.

I claim:

1. In a corn husking machine having a conveyor and a blower positioned at one side of said conveyor, said blower having an opening for receiving material from the conveyor, a rotary beater positioned adjacent and above said opening and comprising longitudinal blades, certain of which are angularly disposed with relation to the axis of said beater.

2. In a corn husking machine having a conveyor and a blower positioned at one side of said conveyor, said blower having an opening for receiving material from the conveyor, a rotary beater positioned adjacent and above said opening and comprising longitudinal blades and radial fingers.

3. In a corn husking machine having a conveyor and a blower positioned at one side of said conveyor, said blower having an opening for receiving material from the conveyor, a rotary beater positioned adjacent and above said opening and comprising longitudinal blades and radial adjustable fingers.

4. In a corn husking machine having a conveyor and a blower positioned at one side of said conveyor, said blower having an opening for receiving material from the conveyor, a rotary beater positioned adjacent and above said opening and comprising longitudinal blades and radial transverse fingers, certain of said blades being angularly disposed with relation to the longitudinal axis of said beater.

5. In a corn husking machine having a conveyor and a blower positioned at one side of said conveyor, said blower having an opening for receiving material from the conveyor, a rotary beater positioned adjacent and above said opening and comprising longitudinal blades and adjustable radial transverse fingers, certain of said blades being angularly disposed with relation to the longitudinal axis of said beater.

6. In a corn husking machine having a conveyor and a blower positioned at one side of said conveyor, said blower having an opening for receiving material from the conveyor, a rotary beater positioned adjacent and above said opening and comprising a shaft, a pair of end plates mounted on said shaft, spaced parallel longitudinal plates secured upon said shaft and to said end plates, longitudinal plates secured to said parallel plates and said end plates, said longitudinal plates being angularly disposed with relation to the axis of said shaft, and transverse radial fingers adjustably mounted between said parallel plates.

In testimony that I claim the foregoing I have hereunto set my hand at Milwaukee, in the county of Milwaukee and State of Wisconsin.

AUGUST ROSENTHAL.